United States Patent
Ishigami

(10) Patent No.: US 6,415,165 B1
(45) Date of Patent: Jul. 2, 2002

(54) PORTABLE TELEPHONE DEVICE WITH ADDITIONAL DISPLAY AND DATA INPUTTING CAPABILITY

(75) Inventor: Masahiro Ishigami, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/350,834

(22) Filed: Jul. 9, 1999

(30) Foreign Application Priority Data

Jul. 10, 1998 (JP) .......................................... 10-195556

(51) Int. Cl.[7] ................................................ H04B 1/38
(52) U.S. Cl. ........................ 455/566; 455/90; 455/550; 455/575; 345/173; 379/430
(58) Field of Search ................................ 455/566, 569, 455/575, 90, 564, 565, 567, 550; 379/430, 433, 368, 354; D21/517; 345/173–179

(56) References Cited

U.S. PATENT DOCUMENTS 5,610,971 A * 3/1997 Vandivier ..................... 379/58
2001/0003707 A1 * 6/2001 Moriya ........................ 455/566

FOREIGN PATENT DOCUMENTS

| EP | 0 865 184 A1 | 9/1998 |
| GB | 2 330 981 A | 5/1999 |
| GB | 2 330 982 A | 5/1999 |
| JP | 6-177809 | 6/1994 |
| JP | 7-111673 | 4/1995 |
| JP | 7-240776 | 9/1995 |
| JP | 8-305496 | 11/1996 |
| JP | 9-654346 | 3/1997 |
| JP | 11-68896 | 3/1999 |

* cited by examiner

Primary Examiner—Lester G. Kincaid
Assistant Examiner—Khawar Iqbal
(74) Attorney, Agent, or Firm—Scully, Scott, Murphy & Presser

(57) ABSTRACT

A portable terminal comprises a main body having a front surface and a rear surface opposite to the front surface. The portable terminal comprises a display section formed on the front surface for displaying input information of the portable terminal, a main operating section formed on the front surface for carrying out input operation of said input information, and a touch panel formed on the rear surface for carrying out input operation of the input information. The touch panel is operated by a user with gripping the main body on a hand. The portable terminal monitors the touch panel in a predetermined interval to produce a monitored signal and is responsive to the monitored signal for make the display section display the input information.

5 Claims, 5 Drawing Sheets

PORTABLE TELEPHONE DEVICE WITH ADDITIONAL DISPLAY AND DATA INPUTTING CAPABILITY

BACKGROUND OF THE INVENTION

This invention relates to a mobile terminal device, and more particularly, to a portable telephone device of a small size.

In general, a portable terminal device such as a PHS terminal and a mobile telephone device has a plurality of functions. The functions are established by an operating section such as operation switches or a keyboard mounted on the body of the portable terminal. Similarly, the established functions are selectively carried out by the operating section in accordance with menu items on a display unit. In order to reduce the size and the weight of the portable terminal, it is necessary to make the operating section be small in area.

In case where the operating section becomes small in area, it is difficult to correctly and efficiently operate the operating section by fingers with no error. In other words, it is difficult to correctly and efficiently operate the operating section with reducing the size and the weight of the portable terminal. Furthermore, it is necessary to carry out operation without relying on a mechanical structure in order to avoid aging and failures.

SUMMARY OF THE INVENTION

It is therefore an object of this invention to provide a small-sized portable terminal capable of easily carrying out operation.

Other objects of this invention will become clear as the description proceeds.

On describing the gist of this invention, it is possible to understand that a portable terminal comprises a main body having a main surface and a secondary surface opposite to the main surface.

According to this invention, the portable terminal comprises a display section formed on the main surface for displaying input information of the portable terminal, a main operating section formed on the main surface for carrying out input operation of the input information, and an additional operating section formed on the secondary surface for carrying out input operation of the input information.

DESCRIPTION OF THE PREFERRED EMBODIMENTS

Figure 1A:
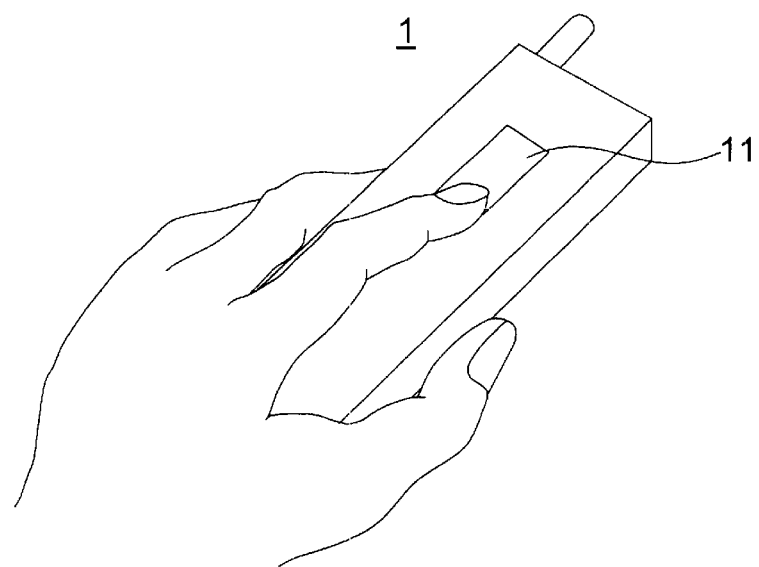
FIGS. 1A and 1B show prospective views of a portable terminal according to a first embodiment of this invention.
Figure 1B:
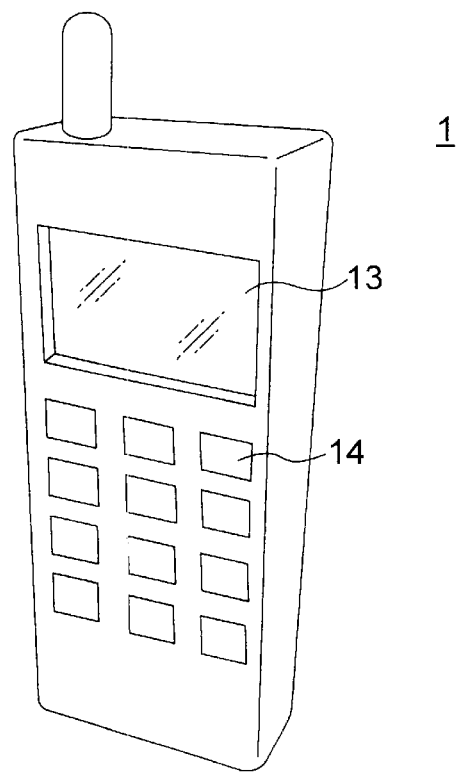
Figure 2A:
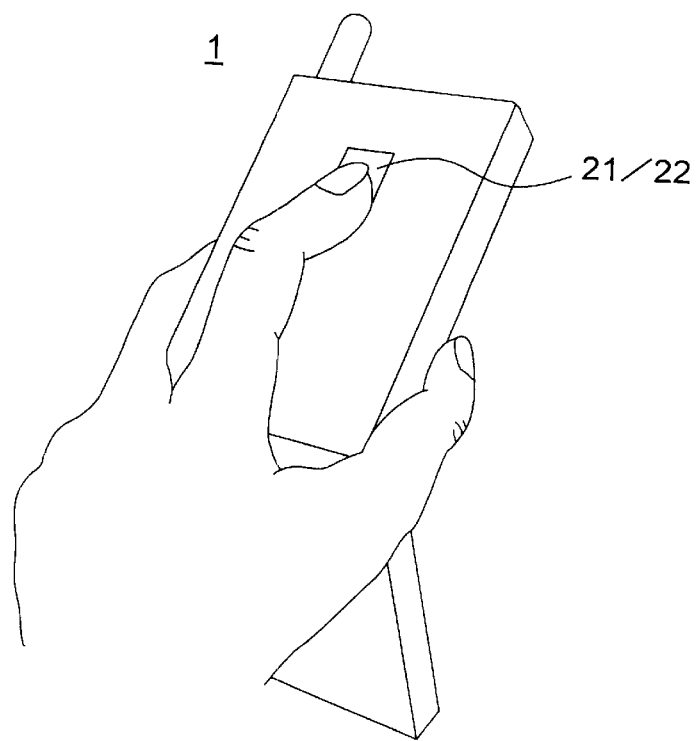
FIGS. 2A and 2B show prospective views of a portable terminal according to a second embodiment of this invention.
Figure 2B:
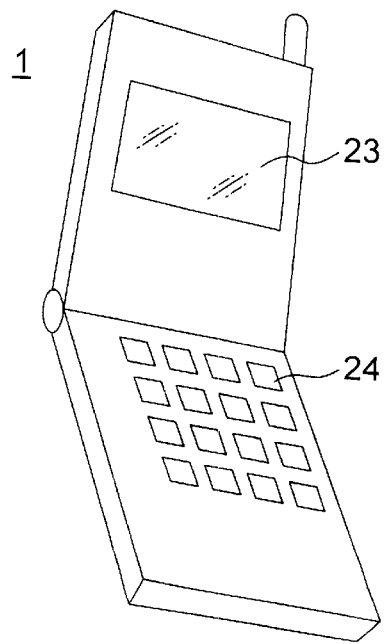

The portable terminal illustrated in FIGS. 1A and 1B is used as a mobile terminal. The mobile terminal illustrated in FIGS. 1A and 1B has a rectangular shaped body as a terminal body. Similarly, the portable terminal illustrated in FIGS. 2A and 2B is used as a mobile terminal. The mobile terminal illustrated in FIGS. 2A and 2B is a foldout portable phone. FIG. 1A shows a view taken from the rear surface of the mobile terminal. Similarly, FIG. 2A shows a view taken from the rear surface of the mobile terminal. In each of FIGS. 1A and 2A, the mobile terminal is grasped by a hand that operates the mobile terminal. Thus, a user actually operates the mobile terminal.

FIGS. 1B and 2B are perspective views of the rectangular shaped portable terminal and the foldout portable phone, respectively, as viewed from the front side. In the foldout portable phone shown in FIGS. 2A and 2B, a display section and an operating section are moved toward each other and folded via a hinge mechanism. A loudspeaker is mounted in the display section. A microphone is mounted in the operating section.

Referring to FIGS. 1A and 1B, the illustrated portable terminal 1 comprises a terminal body having a front or main surface and a rear surface which is positioned on an opposite side of the main surface. A display section 13 and a main operating section 14 are mounted or formed on the main surface. A touch panel or touch screen 11 is formed on the rear surface. As shown in FIG. 1A, the user can touch the touch panel 11 by its forefinger to operate the portable terminal 1 when the portable terminal 1 is held by the hand.

The touch panel 11 has a variable resistance which is varied on the basis of a physical pressure. More particularly, the resistance value is varied in a portion to which the physical pressure is applied. In the example being illustrated, a resistive membrane touch panel is used as the touch panel 11 which is capable of detecting depression of a finger.

The touch panel 11 of the resistive membrane detects a coordinate from a voltage value obtained by the fact that the conducting position of a resistive membrane is resistance-divided by an external pressure. When a voltage is applied to the touch panel 11 and when any arbitrary position on the touch panel is depressed with a finger or pen, a different voltage value is obtained, depending on a different depressed position. Therefore, the depressed position is determined from the observed voltage value.

By conducting an operation for determining the position continuously, the direction of the stroke and the interval are calculated and detected as a vector quantity when a stroke is made on the touch panel 11. The amount of vector obtained on the touch panel 11 is correlated with picture information displayed on the display section 13 at this time. This causes the user to recognize information selected by the user.

A small-sized CPU equipped with a 2-channel A/D converter is normally used as a circuit that is connected to the touch panel 11. The CPU detects a position of pressure. In case where a CPU used for other purpose is mounted within the portable terminal having the touch panel 11, the CPU may be used for the touch panel 11. In the example being illustrated, it is assumed that a dedicated touch panel entry processor processes inputs from the touch panel 11.

Where the touch panel input processor is regarded as parts, there are various needs. For example, a finger is placed on the display screen of a PDA (personal digital assistant) or a cash dispenser of a bank to select desired menu items. Also, a touch panel input processor is used as a mouse for a notebook computer. Therefore, the touch panel input processor has been built as general-purpose ICs and is easily commercially available. For example, a position-detecting device for touch panel is listed in the product catalog of "Controller AHL-301A" of Gunze Co., Ltd.

Referring to FIGS. 2A and 2B, the illustrated portable terminal 1 is the foldout portable phone as described above. The portable terminal 1 comprises a terminal body having a front or main surface and a rear surface which is positioned on an opposite side of the main surface. A display section 23 and a main operating section 24 are mounted or formed on the main surface. An auxiliary display portion 22 consisting of a small-sized LCD (liquid crystal display) is formed on the rear surface. As shown in FIG. 2A, a touch panel 21 is stuck on the auxiliary display portion 22. The touch panel 21 is made of a transparent material. The portable terminal 1 illustrated in FIGS. 2A and 2B is similar in structure to the portable terminal 1 illustrated in FIGS. 1A and 1B.

The auxiliary display portion 22 is an auxiliary display device and is fitted to the foldout portable phone. The foldout portable phone has the advantage that it is possible to protect the main display section 23 and the main operating section 24 when the foldout portable phone is folded. However, it is impossible to check the state of operation in the foldout portable phone until the foldout portable phone is unfolded. Therefore, it is desired that various kinds of information can be confirmed even if the foldout portable phone is closed. For example, the various kinds of information indicate whether the power supply is ON or OFF, the amount of remaining charge in the battery, and whether the received electric field is strong enough to permit communication. Inasmuch as the main display portion 23 is concealed in a folded state, the above-mentioned kinds of information cannot be checked in the folded state. Accordingly, the auxiliary display portion 22 is mounted on the rear surface of the main body to provide a display of the kinds of information. In order to achieve space saving and miniaturization, the transparent touch panel 21 is laid on the auxiliary display portion 22.

Figure 3:
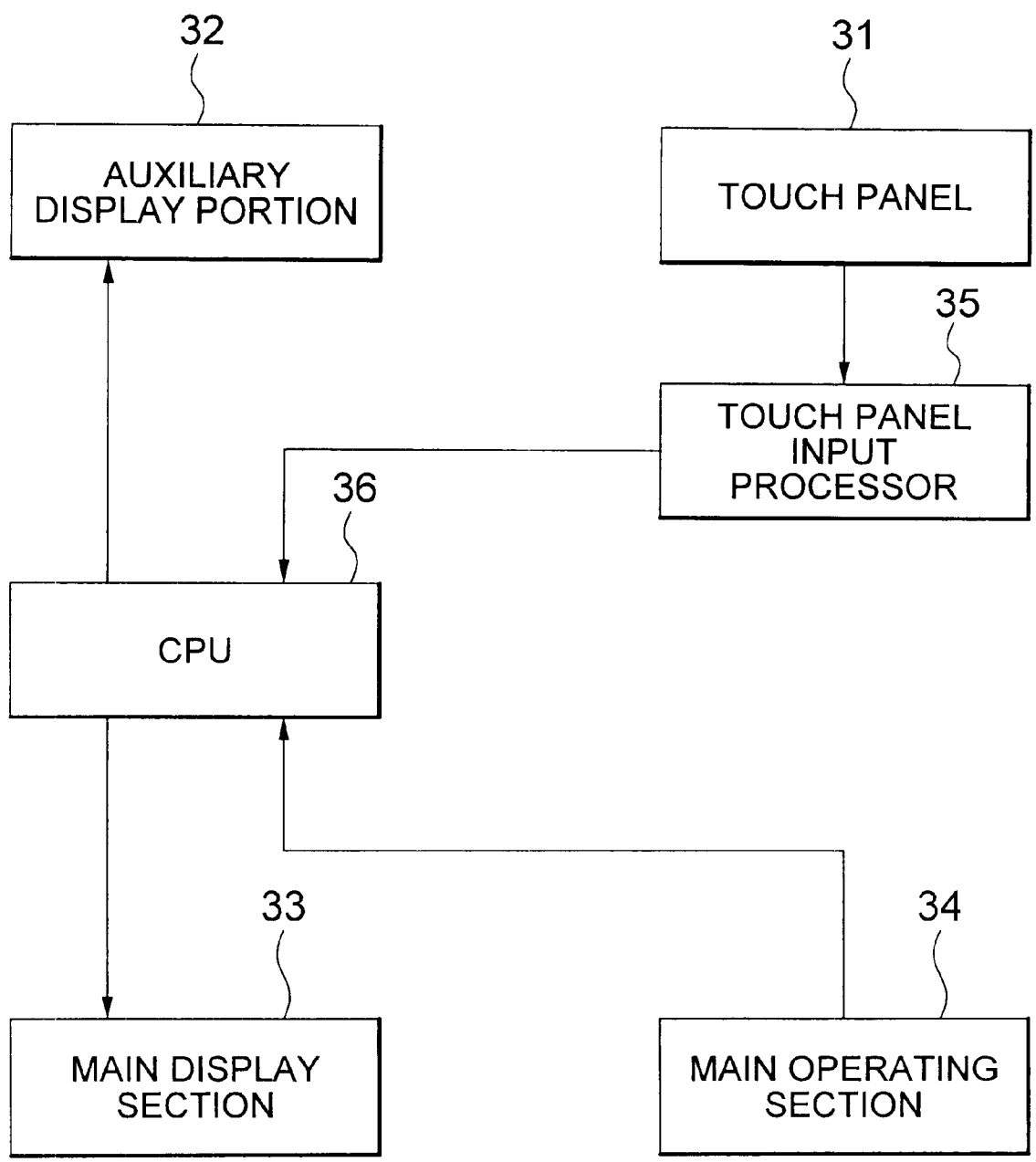
FIG. 3 is a block diagram of a configuration of a portable terminal illustrated in each of FIGS. 1A and 1B and FIGS. 2A and 2B.

Referring to FIG. 3, the illustrated portable terminal comprises a touch panel 31, a touch panel input processor 35, an auxiliary display portion 32, a CPU 36, a main display section 33, and a main operating section 34. A signal applied to the touch panel 31 enters the touch panel input processor 35 to be primarily processed. The signal applied to the touch panel input processor 35 from the touch panel 31 has an analog voltage value indicating the position on the touch panel 31 that is presently depressed. An A/D converter incorporated in the touch panel input processor 35 reads the analog voltage value at regular intervals and accepts as a coordinate value. Unstable data are eliminated. Chattering processing is conducted. Then, the CPU 36 is informed of the coordinates and the state.

The CPU 36 provides a display on the main display section 33 in order to give information for a choice to the user. The user's instructions for operations are entered from the main operating section 34 and from the touch panel input processor 35. The CPU 36 selects information in accordance with the user's instructions.

Figure 4A:
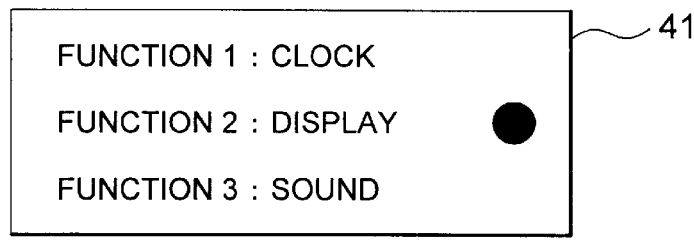
FIGS. 4A to 4C are diagrams showing examples of displayed image.
Figure 4B:
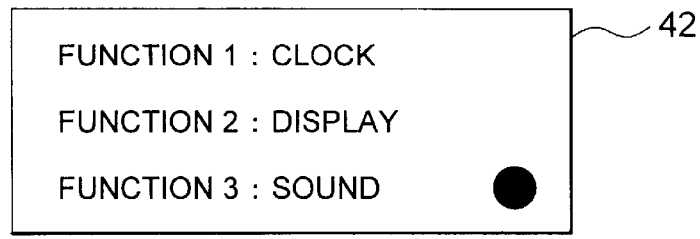
Figure 4C:
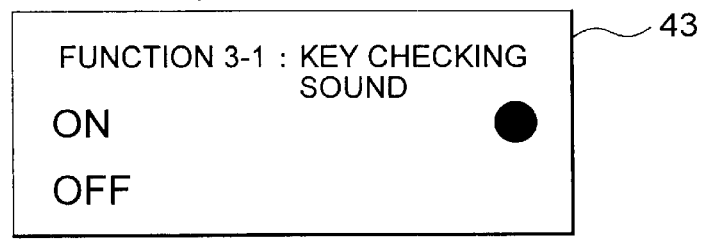

Referring to FIG. 4, the main display section 33 may display a frame of image illustrated in FIG. 4. In the example being illustrated, illustration is made about a menu for selecting functions of the portable terminal. In the frame of image shown in FIG. 4, the select functions contains three stages of items "Clock", "Display", and "Sound" as shown in FIG. 4A. As shown in FIG. 4B, the function of "Sound" is selected. Black circles indicate the items presently selected. As shown in FIG. 4C, "Key Checking Sound" that is one element of the functions of "Sound" is set to an on-state.

Figure 5:
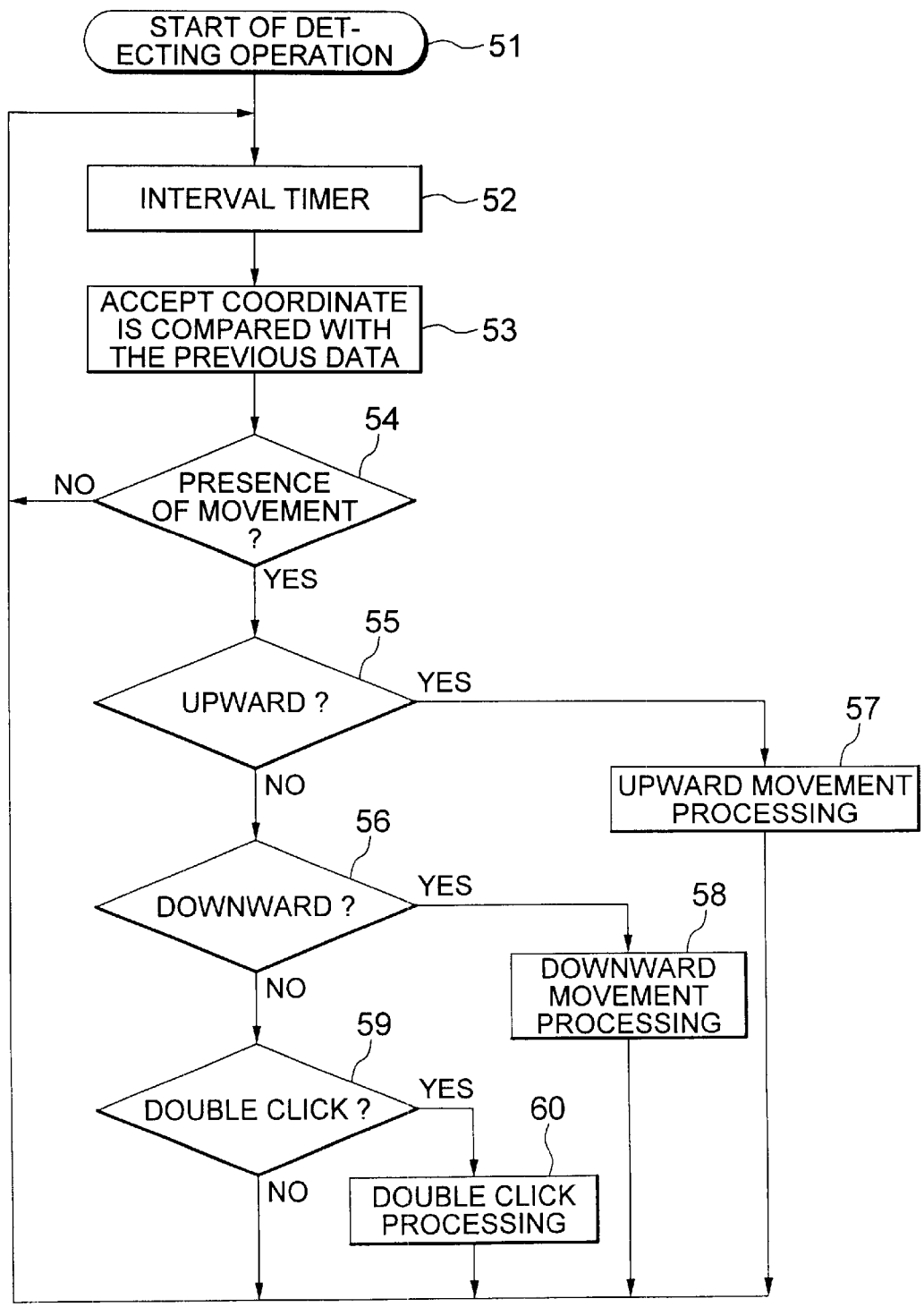
FIG. 5 is a flowchart for describing operation of the portable terminal of this invention.

Referring to FIG. 5, the CPU 36 carries out operation in accordance with a flowchart illustrated in FIG. 5. The CPU 36 first provides a display as shown in FIG. 4A on the main display section 33. The display contains three functions as described above. A black circle indicating the present state is displayed beside the "Display" that is one of the three functions. At that time, the CPU 36 starts a detection operation at a first step 51.

After the start of the operation for detection, the CPU 36 first performs interval timer processing at a second step 52. The interval timer processing gives time intervals to the detection of the touch panel 31. If detection of the touch panel 31 is constantly carried out, burden will be imposed on the CPU 36. Therefore, it suffices to establish time intervals of about 200 msec.

The CPU 36 accepts coordinates and makes a comparison with the previous data at a third step 53. The CPU 36 takes the difference between coordinate information obtained from the touch panel input processor 35 (coordinate information obtained previous time from the recurring loop shown in FIG. 5) and coordinate information obtained this time. The CPU 36 calculates the direction and the amount of the movement of the finger placed on the touch panel 31 during the time interval between the previous sampling and the present sampling.

The CPU 36 judges an operation that the user is intended to perform, on the basis of the information obtained in the third step 53. More particularly, the CPU 36 checks whether or not motion has taken place on the touch panel 31 at a fourth step 54. If movement of the position is absent, including the case in which no finger is in touch panel with the touch panel 31, operation proceeds to the second step 52.

When movement of the position has taken place, operation goes to a fifth step 55, In the fifth step 55, the CPU 36 checks whether or not the movement is upward. When the movement is not upward, operation goes to a sixth step 56. In the sixth step 56, the CPU 36 checks whether or not the movement is downward.

When the result of any decision step, including the immediately previous decision step and more previous decision steps, indicates that the finger on the touch panel 31 has moved a distance more than a given amount in an upward direction, then it is determined that an upward movement has occurred. Operation goes to seventh step 57 at which upward movement processing is performed.

When the result of the decision is that the finger on the touch panel 31 has moved a distance more than the given amount in a downward direction, then it is determined that a downward movement has occurred. Operation goes to an eighth step 58 at which downward movement processing is carried out.

The upward movement processing in the seventh step 57 and the downward movement processing in the eighth step 58 mean a state transition within the control software run by the CPU 36 and a modification of the display provided on the display section.

As an example of the downward movement, the frame of image 42 is shown in FIG. 4B. Comparing FIG. 4B with FIG. 4A, the black circle has shifted from "Display" to "Sound" in the displayed image 42 in FIG. 4B. Information of the downward movement is given on the touch panel 31. This informs the user that the user could successfully move the black circle downward. Hence, a feeling of accomplishment is given to the user. That is, the user can check the completion of the movement operation. A feedback is provided on the display.

After end of the upward movement processing in the seventh step 57 and the downward movement processing in eighth step 58, operation returns back to the processing of the second step 52. The processing loop starting with detection of input from the touch panel 31 is repeated.

Double click processing is next described. A double click means an operation consisting of depressing the same point on the touch panel 31 at a given interval of time.

The double click processing is the same as the processing ending with the decision about upward movement in fifth step 55 and the decision about downward movement in sixth step 56, until information from the touch panel 31 is derived. Operation returns back to a considerably remote loop position from a ninth step 59. At a predetermined interval of time, detection is made about whether or not the finger is placed on the touch panel 31 within a predetermined frame. For example, the same area is depressed during a period of 200 to 600 msec. No input is present during a period of 200 to 600 msec. Furthermore, the same area is depressed during a period of 200 to 600 msec. In this case, the CPU 36 detects the double click at the ninth step 59. When the double click is detected, the CPU 36 carries out the double click processing in a tenth step 60.

A transition from the display 42 in FIG. 4B to the image 43 in FIG. 4C is one example of the double click processing in the tenth step 60. In the transition from display 41 in FIG. 4A to display 42 in FIG. 4B, the black circle is shifted to "Sound". Under this condition, when a double click is detected, the displayed contents are shifted to display 43 in FIG. 4C. FIG. 4C is a choice menu for causing the user to select "Key Checking Sound". This is one of choices of functions regarding "Sound". After performing the double click processing in the tenth step 60, operation returns back to the second step 52. The processing described above is continued until selection of a function that is assumed to induce a detection operation ends.

In the embodiment described above, a dedicated touch panel input processor is used to control input processing from the touch panel. The input processing from the touch panel may be converted into digital form by switching an A/D converter for detection of the power-supply voltage or an A/D converter for detection of the level of the received electric field in terms of time. These converters are normally built into portable phones.

In the embodiment described above, upward movement or downward movement is selected as a method of selecting information, as illustrated in the flowchart of FIG. 5. Alternatively, the processing conducted by the software in the touch panel input processor may be modified, and a choice is made by detecting horizontal movement and counterclockwise rotation.

Although double click is used as a method of determining information, other methods can, of course, be employed by modifying the software processing in the touch panel input processor. As a first example, if no input is present for a given time after an input for upward or downward movement is entered, establishing processing is performed. As a second example, if horizontal movement is detected, establishing processing is performed. As a third example, the main control portion is operated to enter an instruction, for performing establishing processing.

In the above embodiment, the resistive membrane type touch panel is of the analog input type. A digital input touch panel consisting of a touch panel divided into cells may also be used. In this case, the number of interfaces from the touch panel is increased by an amount equal to the number of the cells. However, the detection circuit needs no A/D converter. Also, digital logic detection relying on ordinary port input can be utilized.

While this invention has thus far been described in conjunction with the preferred embodiments thereof, it will readily be possible for those skilled in the art to put this invention into practice in various other manners.

What is claimed is:

1. A portable terminal comprising
    a main body having a main surface and a secondary surface opposite to said main surface;
    a display section formed on said main surface for displaying input information of said portable terminal;
    a main operating section formed on said main surface for carrying out input operation of said input information;
    an additional operating section formed on said secondary surface for carrying out input operation of said input information,
    said additional operating section having a touch panel for carrying out input operation of said input information,
    said touch panel being operated by a user by gripping said main body by hand, wherein said portable terminal further comprises:
        first means for monitoring said touch panel in a predetermined interval to produce a monitored signal; and
        second means responsive to said monitored signal to make said display section display said input information.

2. A portable terminal as claimed in claim 1, wherein said main and said secondary surfaces are front and rear surfaces, respectively.

3. A portable terminal, said portable terminal is a foldout type, comprising
    a main body having a main surface and a secondary surface opposite to said main surface;
    a display section formed on said main surface for displaying input information of said portable terminal;
    a main operating section formed on said main surface for carrying but input operation of said input information;
    an additional operating section formed on said secondary surface for carrying out input operation of said input information, said additional operating section comprising
        an auxiliary display portion fitted on said secondary surface for displaying information of said portable terminal; and
        a touch panel fitted on said secondary surface for carrying out input operation of said input information, said touch panel being operated by a user by gripping said main body by hand, wherein said portable terminal further comprises:
            first means for monitoring said touch panel in a predetermined interval to produce a monitored signal; and
            second means responsive to said monitored signal to make each of said display section and said auxiliary display portion display said input information.

4. A portable terminal as claimed in claim 3, wherein said touch panel is mounted on said auxiliary display portion.

5. A portable terminal, said portable terminal is a foldout type, comprising
    a main body having a main surface and a secondary surface opposite to said main surface;
    a display section formed on said main surface for displaying input information of said portable terminal;
    a main operating section formed on said main surface for carrying out input operation of said input information;

an additional operating section formed on said secondary surface for carrying out input operation of said input information, said additional operating section comprising a touch panel fitted on said secondary surface for carrying out input operation of said input information, said touch panel being operated by a user by gripping said main body by hand, wherein said portable terminal further comprises:

first means for monitoring said touch panel in a predetermined interval to produce a monitored signal; and second means responsive to said monitored signal to make said display section display said input information.

* * * * *